United States Patent
Heen et al.

(10) Patent No.: US 8,499,061 B2
(45) Date of Patent: Jul. 30, 2013

(54) METHOD FOR INSERTING A NEW DEVICE IN A COMMUNITY OF DEVICES

(75) Inventors: Olivier Heen, Domloup (FR); Nicolas Prigent, Rennes (FR)

(73) Assignee: Thomson Licensing, Issy-les-Moulineaux (FR)

( * ) Notice: Subject to any disclaimer, the term of this patent is extended or adjusted under 35 U.S.C. 154(b) by 385 days.

(21) Appl. No.: 10/589,655

(22) PCT Filed: Feb. 16, 2005

(86) PCT No.: PCT/EP2005/050693
§ 371 (c)(1),
(2), (4) Date: Aug. 16, 2006

(87) PCT Pub. No.: WO2005/079018
PCT Pub. Date: Aug. 25, 2005

(65) Prior Publication Data
US 2007/0198673 A1    Aug. 23, 2007

(30) Foreign Application Priority Data
Feb. 16, 2004    (EP) .................................... 04290417

(51) Int. Cl.
*G06F 15/173*    (2006.01)
(52) U.S. Cl.
USPC ........... 709/223; 709/220; 709/217; 709/229; 709/230; 455/519; 455/518; 713/1; 713/153; 713/155; 713/170; 713/176; 726/4; 726/17; 726/15; 726/21; 726/29

(58) Field of Classification Search
USPC .............. 709/217, 220, 223, 229, 230; 713/1, 713/153, 155, 170, 176; 726/4, 17, 15, 21, 726/29; 455/518, 519
See application file for complete search history.

(56) References Cited

U.S. PATENT DOCUMENTS

| | | | | |
|---|---|---|---|---|
| 6,519,629 B2 * | 2/2003 | Harvey et al. | ................. | 709/204 |
| 6,525,747 B1 * | 2/2003 | Bezos | ........................... | 715/751 |
| 6,604,140 B1 * | 8/2003 | Beck et al. | .................... | 709/226 |
| 6,772,195 B1 * | 8/2004 | Hatlelid et al. | ............... | 709/204 |
| 6,829,487 B2 * | 12/2004 | Eiden et al. | ................... | 455/519 |
| 7,058,719 B2 * | 6/2006 | Motoyama | .................... | 709/228 |
| 7,089,298 B2 * | 8/2006 | Nyman et al. | ................. | 709/220 |
| 7,114,010 B2 * | 9/2006 | Karaoguz et al. | ............ | 709/250 |
| 7,171,476 B2 * | 1/2007 | Maeda et al. | ................. | 709/227 |
| 7,190,961 B2 * | 3/2007 | Burr | ............................. | 455/502 |
| 7,251,222 B2 * | 7/2007 | Chen et al. | .................... | 370/256 |
| 7,304,968 B2 * | 12/2007 | Dawidowsky et al. | ....... | 370/331 |
| 7,340,057 B2 * | 3/2008 | Martin et al. | ................. | 380/247 |
| 7,349,360 B2 * | 3/2008 | Gutierrez et al. | ............ | 370/315 |
| 2003/0204734 A1 | 10/2003 | Wheeler | | |
| 2004/0168081 A1 * | 8/2004 | Ladas et al. | ................... | 713/201 |

FOREIGN PATENT DOCUMENTS

| | | |
|---|---|---|
| EP | 1102430 | 5/2001 |
| EP | 1257144 | 11/2002 |
| WO | WO 02/063847 | 8/2002 |

OTHER PUBLICATIONS

Search Report Dated May 25, 2005.

* cited by examiner

*Primary Examiner* — Carl Colin
*Assistant Examiner* — Mohammad A Siddiqi
(74) *Attorney, Agent, or Firm* — Myers Wolin, LLC

(57) ABSTRACT

The invention relates to a method for inserting a new device in a community of devices wherein each device of the community is able to store insertion requests received from at least one new device and to forward these insertion requests to a device chosen by a user of the community for confirming authorization to join the community.

8 Claims, 13 Drawing Sheets

METHOD FOR INSERTING A NEW DEVICE IN A COMMUNITY OF DEVICES

This application claims the benefit, under 35 U.S.C. §365 of International Application PCT/EP05/050693, filed Feb. 16, 2005, which was published in accordance with PCT Article 21(2) on Aug. 25, 2005 in English and which claims the benefit of European patent application No. 04290417.7, filed on Feb.16, 2004.

FIELD OF THE INVENTION

The invention applies to digital networks and communities of devices.

BACKGROUND ART

A community of devices is a set of devices that can communicate (permanently of periodically), and that are linked by a trust relation. One can refer to "*Secure Long Term Communities in Ad Hoc Networks*, N. Prigent, C. Bidan, J. P. Andreaux, O. Heen, October 2003, 1st ACM Workshop on Security of Ad Hoc and Sensor Networks (SASN)" to find explanations on communities of devices.

Communities are generally encountered in the following domains: ad-hoc networks, digital home networks, collection of UPnP™ devices, personal area networks, secured wireless networks (e.g. networks according to the IEEE 802.11 standard with WPA—Wifi Protected Access).

An insertion operation happens when a new device has to be inserted in a community. At the end of the insertion operation, the new device belongs to the community. Existing device insertion methods require at least one user action, to authorize the entry of the new device in the community.

FIG. 1 illustrates a first known method to obtain user authorization before effective device insertion. This method of authorization using a trusted device is described in "Frank Stajano and Ross Anderson, *The Resurrecting Duckling: Security Issues for Ad-hoc Wireless Networks* (1999)", available at the following address: http://citeseer.nj.nec.com/stajano99resurrecting.html.

In this method, there are four major steps:

In step 2.1, "Insertion request", a trusted device 2 of a community 5 named Detector detects an insertion request from a new device 1 named New.

In step 2.2, "User request", the Detector 2 asks the user 3 for authorization. This step can necessitate user authentication on device 2, using state of the art methods (password, biometry . . . ).

In step 2.3, "User confirm", the user 3 explicitly authorizes the insertion of the new device 1.

In step 2.4, "Insertion confirm", the authorization is sent to the new device 1.

These four main steps can be secured using cryptographic material. They can be followed by other optional steps to exchange additional key material or protocol related information.

It should be noted that this method does not allow the user 3 to choose the device used to authorize the insertion: only the Detector device 2, i.e. the first device of the community having detected the new device 1, can be used.

FIG. 2 illustrates a second method of authorization using a predetermined controller (direct method) described for example in standard ANSI/IEEE Std 802.11 [ISO/IEC DIS 8802-11] "*Wireless LAN Medium Access Control (MAC) and Physical Layer (PHY) Specifications, 1999*", available at the following address: "http://standards.ieee.orglgetieee802/downloadl802.11-1999.pdr".

In this method, there are three major steps:

In step 3.1, "User request", the user 3 directly requests a device insertion, using a user interface of the predetermined controller 4 of a community 5.

In step 3.2, "User confirm", the user 3 explicitly authorizes the insertion of the new device 1 in the community 5.

In step 3.3, "Insertion confirm", the authorization is sent to the new device 1.

These three main steps are generally followed by other steps, among which an action from the user on the new device. This method is used in centralized situations and when there exists pre-shared key to ensure trust between community devices. This is the case for 802.11 networks with WEP (Wired Equivalent Privacy) keys and an access point used as a controller.

It is to be noted that this method does not allow the user 3 to choose the device used to authorize the insertion: only the controller device 4 can be used.

FIG. 3 illustrates a third method of authorization using a predetermined controller (indirect method) described in "*Ed Callaway et al: Home networking with IEEE* 802.15.4: *a developing standard for low rate WPAN*, IEEE Com. Mag. August 2002, pp. 70-76*".

In this method, there are six major steps:

In step 4.1, "Insertion request", a trusted device 2 of a community 5 named Detector detects an insertion request from a new device 1 named New.

In step 4.2, "Forward request", this request is forwarded to a predetermined controller 4 of the community 5.

In step 4.3, "User request", the controller 4 warns the user 3 upon receiving a request from the Detector device 2.

In step 4.4, "User confirm", the user 3 explicitly authorizes the insertion of the new device 1 in the community 5.

In step 4.5, "Forward confirm", the confirmation is forwarded backward to the Detector device 2 and then, in step 4.6, "Insertion confirm", the insertion is confirmed to the new device 1.

It is to be noted that steps 4.5 is not mandatory; in a variant, the controller 4 may directly confirm insertion to the new device 1.

These six main steps can be secured by the use of some keys or other cryptographic material. They can be followed by other optional steps to exchange additional key material or protocol related information.

But this method, as the previous ones does not allow the user 3 to choose the device used to authorize the insertion.

In view of the methods described above, we can see that no known prior art method lets the user choose the device that he wants to use for authorizing insertion of a new device. Either the detector device or a predetermined controller device must be used.

SUMMARY OF THE INVENTION

In order to improve the prior art methods described above, the invention proposes a method for inserting a new device (x) in a community of devices wherein each device of the community stores insertion requests received from new devices and forwards these insertion requests to a device (b) chosen by a user of the community for confirming authorization to join the community.

BRIEF DESCRIPTION OF THE DRAWINGS

The various features and advantages of the present invention and its preferred embodiments are now described with reference to the accompanying drawings which are intended to illustrate and not to limit the scope of the present invention and in which.

DETAILED DESCRIPTION OF THE PREFERRED EMBODIMENTS

One idea of the invention is to de-correlate the detection of a new device and the choice of a specific device of the community for confirmation. A device will inquire for pending insertion requests only once it had been chosen by the user.

Figure 1:
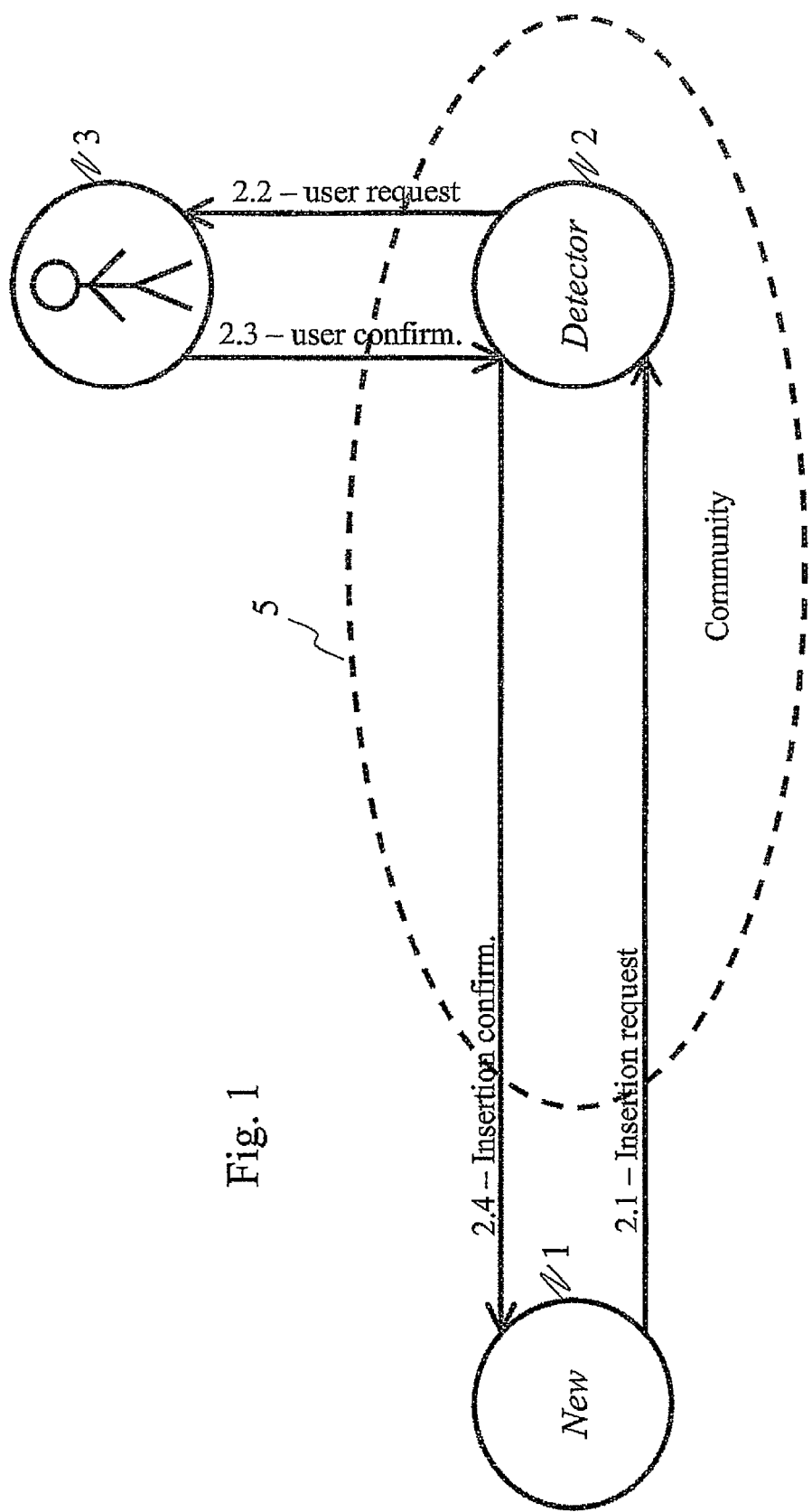
FIGS. 1, 2 and 3, already described, illustrate known examples of authorization of a new device in a community using a trusted device (FIG. 1) or a predetermined controller (direct method—FIG. 2 or indirect method—FIG. 3).
Figure 2:
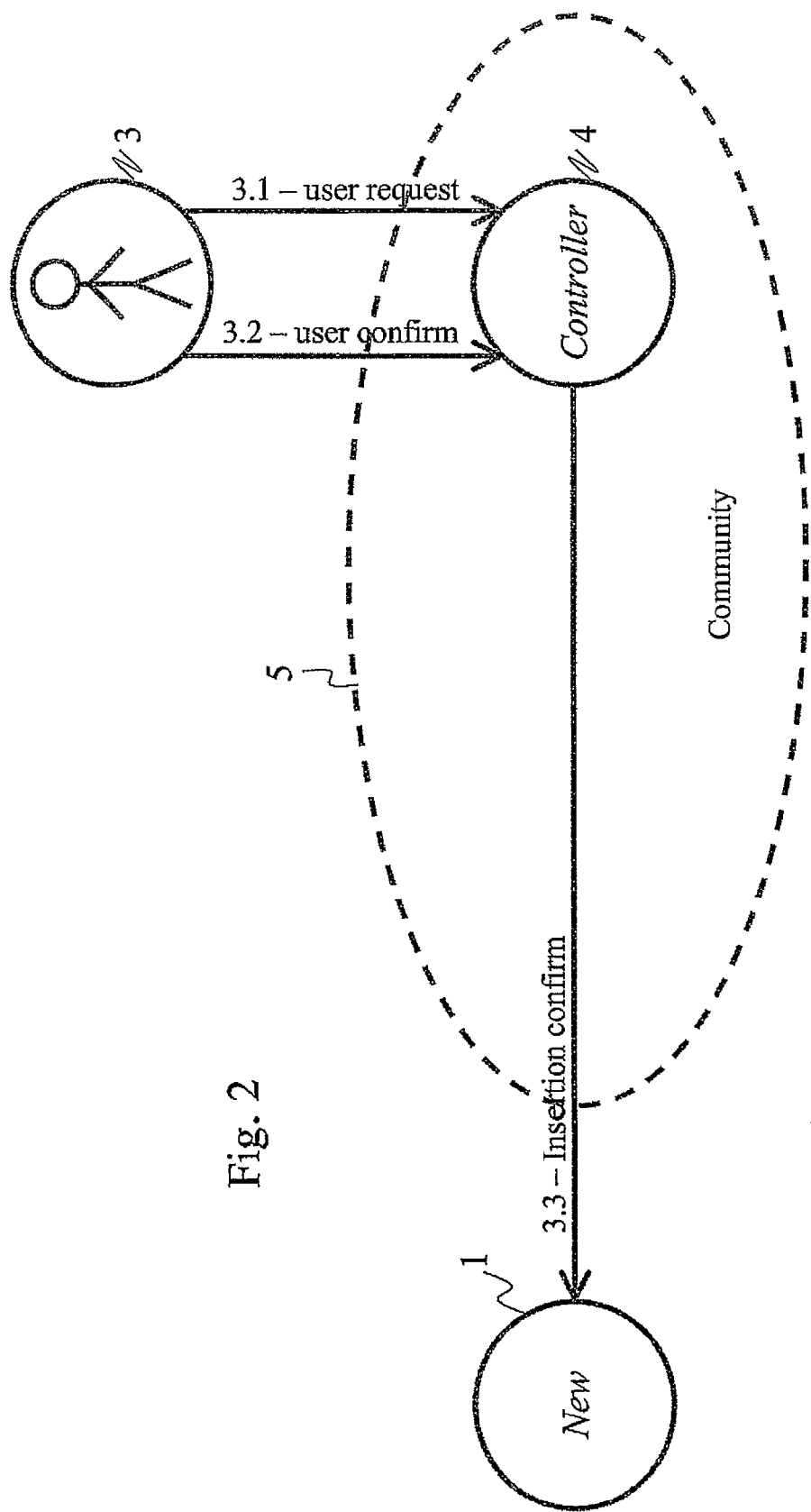
Figure 3:
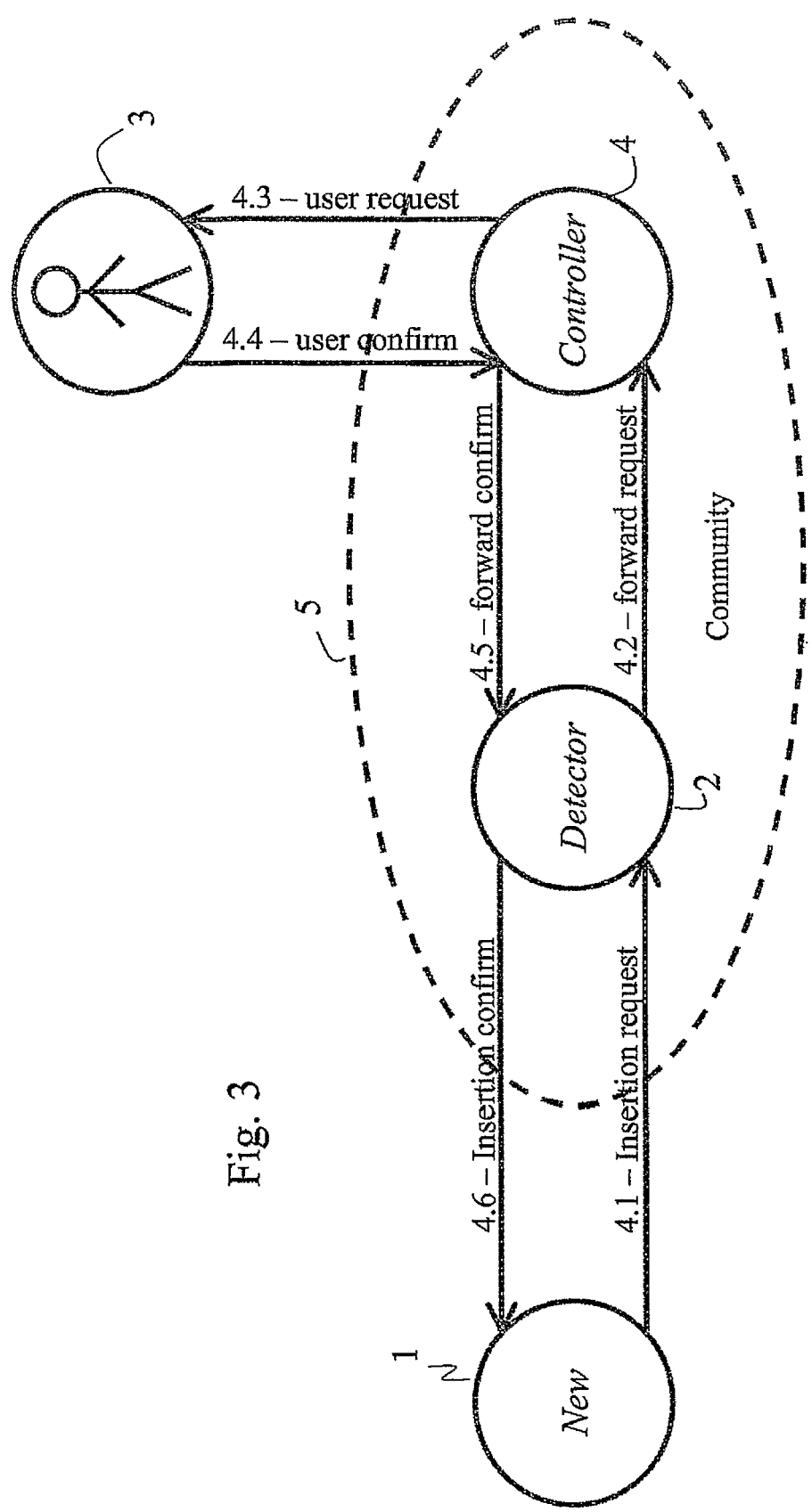
Figure 4:
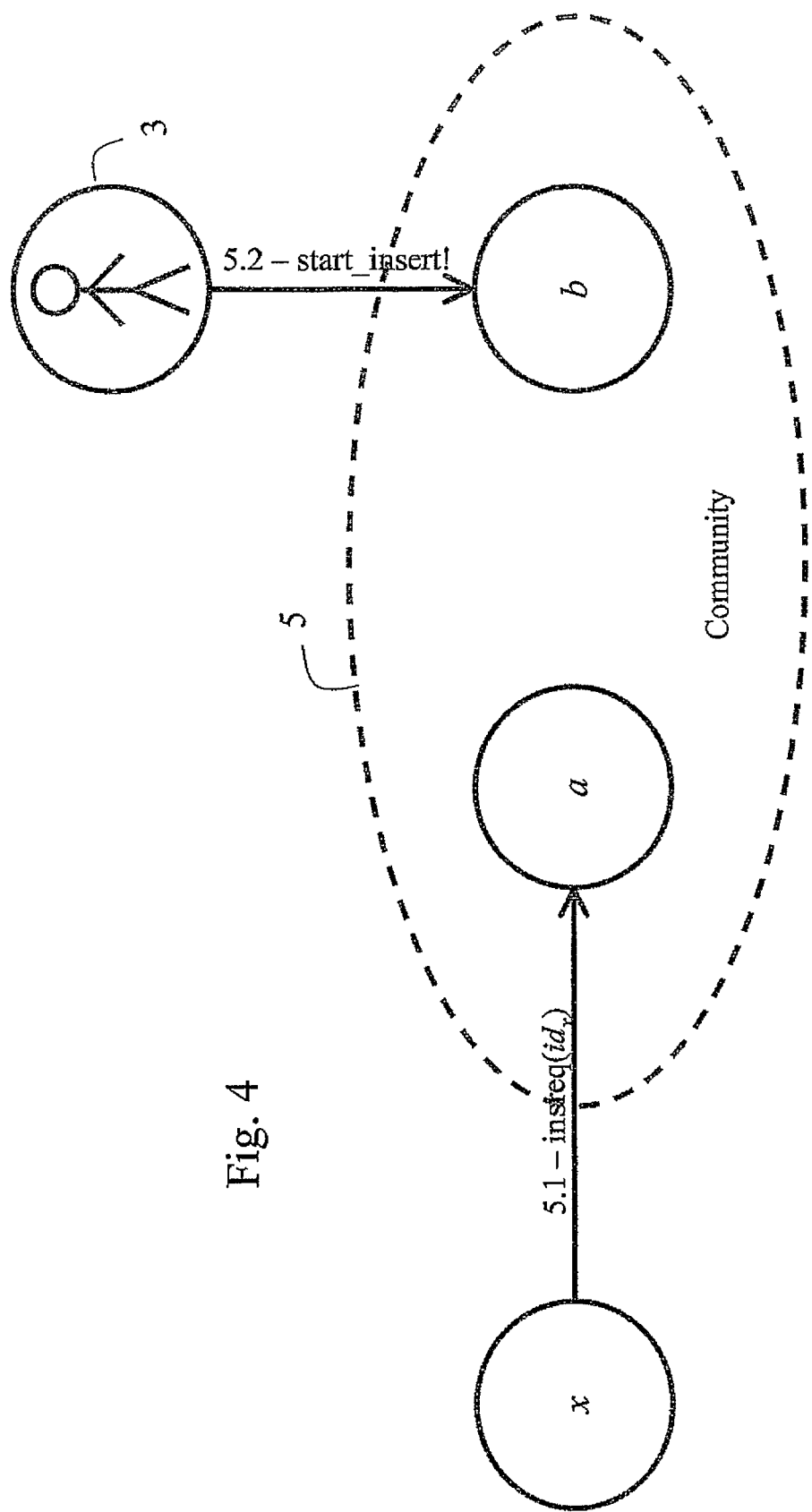
FIGS. 4 to 6 illustrate a method according to the invention.

FIG. 4 illustrates the two first steps of a new insertion method according to the invention.

In step 5.1 an insertion request "insreq($id_x$)" is sent by a new device x and is detected by a device a of a community 5. At this step, device a only stores the request for further use. Then, in step 5.2, the user 3 chooses any device in the community 5 and inquires for pending insertion requests. The chosen device may be device a or another device (in FIG. 4 for example, the user has chosen another device, called b).

As the first step 5.1 is triggered by the incoming of a new device x, and the second step 5.2 is triggered by a user action, there may be an arbitrarily long delay between the two steps. As device b had been chosen freely, there is no a priori reason that b is aware of the existence of an insertion request 5.1 from device x.

Figure 5:
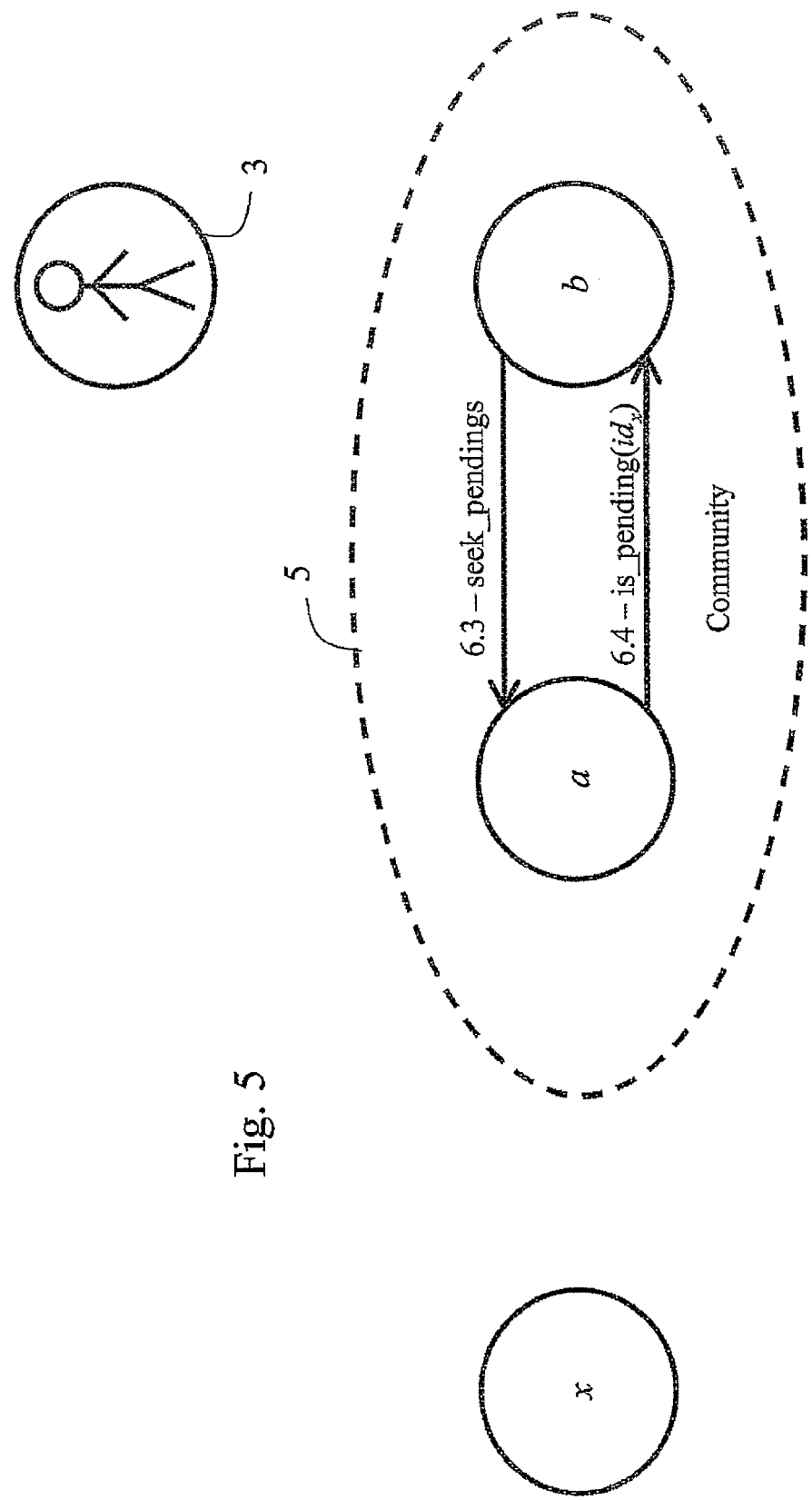

The two next steps of the insertion method according to invention allow device b to collect pending insertion request. These steps are shown in FIG. 5.

In step 6.3, the device b (chosen by the user 3) asks all the reachable devices of the community for pending insertion requests. In step 6.4, all the reachable devices of the community that stored insertion requests answer to b (here, device a answers).

At the end of step 6.4, device b is informed that a device x exists and required insertion. Device b might have received other insertion requests from candidates y, z . . .

The two last steps of the method according to the invention are meant to inform device x that it will be inserted by device b. They are shown in FIG. 6.

In step 7.5, the user 3 chooses, among all pending insertion requests, which one must be satisfied. In FIG. 6, the request from device x will be satisfied. For secure insertion method, this step is also used to validate that the identity claimed by x is correct. Then, in step 7.6, the device x is informed that device b was chosen by the user. The purpose of this step is to allow device x to insert device b in its community when mutual insertion is necessary like in secured long term communities.

It is to be noted that device b is able to communicate with device x, either directly or through another device (ex. device a in FIG. 6) that relay the insertion request. This specific aspect is not part of the invention, but uses state of the art routing methods.

Figure 6:
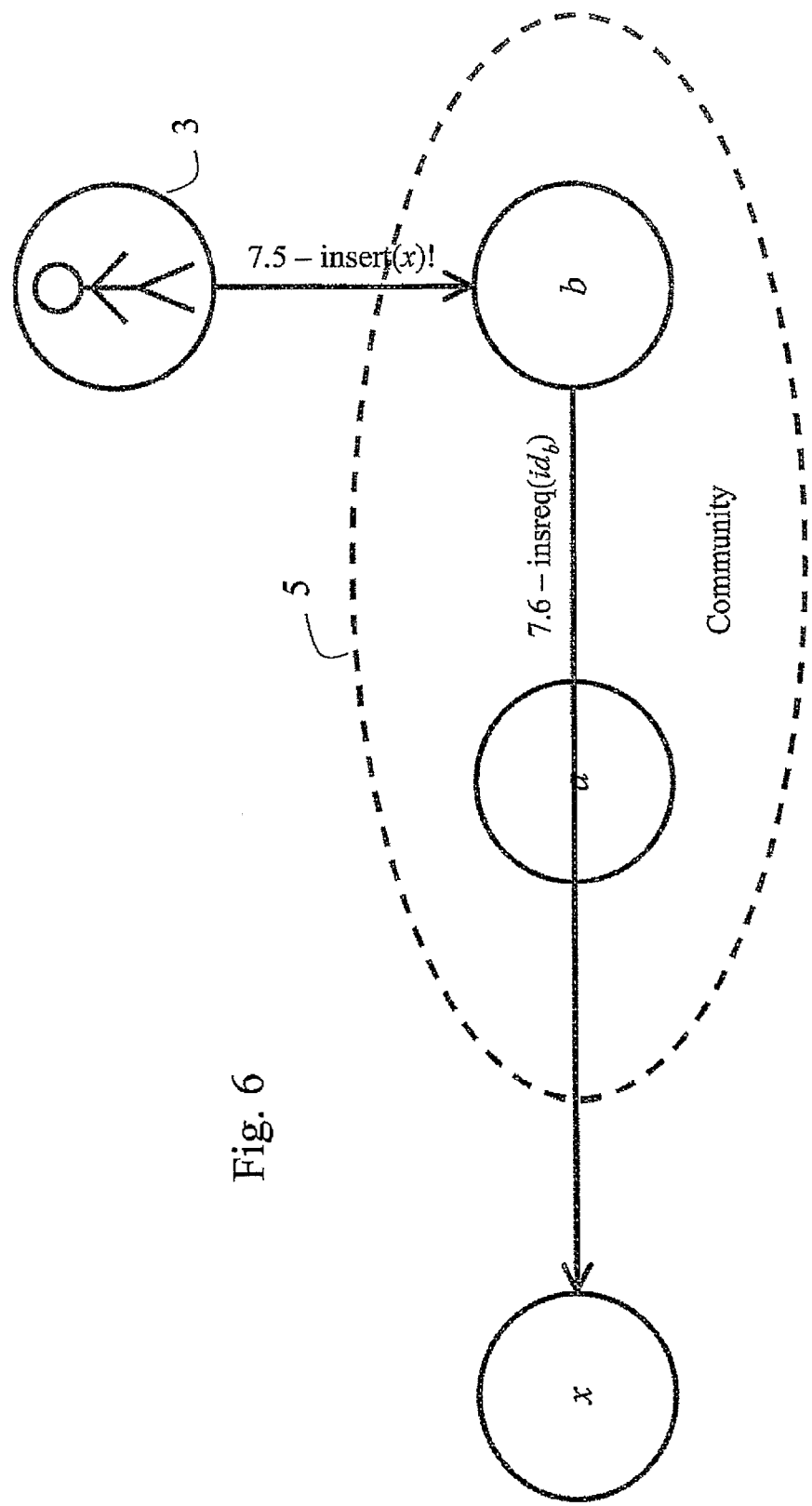

At the end of these 6 steps illustrated by FIGS. 4 to 6, the following situation holds: one device (b) has been chosen by the user 3 for insertion of one new device (x), and both devices are informed of the identity of the other. This is the required situation for any state of the art insertion method to begin.

Figure 7:
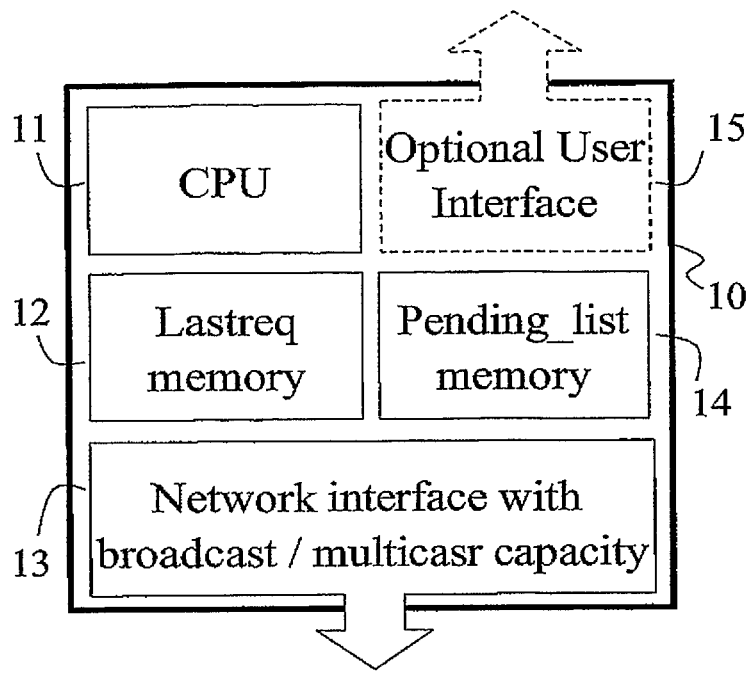
FIG. 7 is a schematic diagram of a device implementing the invention.

An example of a device 10 able to implement the insertion method of the invention is illustrated in FIG. 7.

Figure 8:
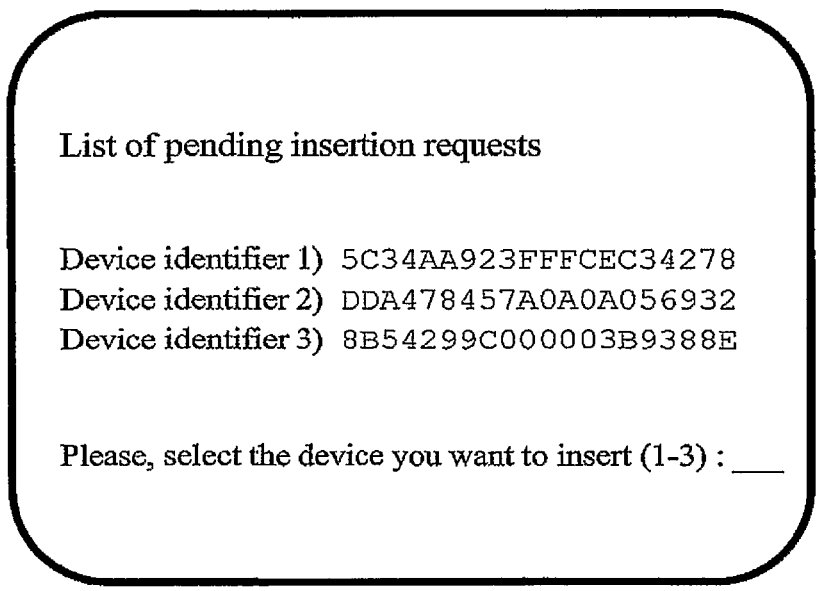
FIG. 8 is an example of interface for device selection.

This device contains:

a CPU 11;

a memory 12 called "lastreq", that can store at least one pending insertion request. A storage time limit (for instance: one hour or one day) is possible but not required for the invention. This memory "lastreq" 12 can be erased to erase pending insertion requests;

a network interface 13 to access at least one network protocol with broadcast or multicast capacity. The broadcast capacity provides a way to address all other devices with one single network transmission and the multicast capacity provides a way to address a particular set of devices with one single network transmission. Both broadcast and multicast capacities are present in most protocols used by communities;

a memory 14 for storing the answers when asking for pending requests. This memory may contain in a preferred embodiment a list of device identifiers. This list is denoted "Pending_List"; It is to be noted that memory 14 and memory 12, although represented separately in FIG. 7, can be a single memory;

an optional User Interface 15 allowing the user to choose one device among several devices that required insertion. This User Interface can be simple, adapted to the display capacities of the device. This feature is required on at least one device of the community, but is optional for the others. An example of a screen interface is given in FIG. 8 where device identifiers are defined by hexadecimal numbers.

We now describe in more details a preferred embodiment of the invention. This description uses notations that are used and explained in more details in document "*Secure Long Term Communities in Ad Hoc Networks*, N. Prigent, C. Bidan, J. P. Andreaux, O. Heen, October 2003, 1st *ACM Workshop on Security of Ad Hoc and Sensor Networks (SASN)*" previously mentioned. For example the device identifier of a device x is denoted $id_x$.

In the following description, x is the new device, a is one of the detectors, b is the user chosen device. The algorithm performed by the devices to realize the invention contains three parts, described hereafter.

First Stage of the Algorithm

This stage allows emission, reception and storage of insertion requests. Its beginning corresponds to step 5.1 in FIG. 4. The user is not involved at this stage.

Figure 9:
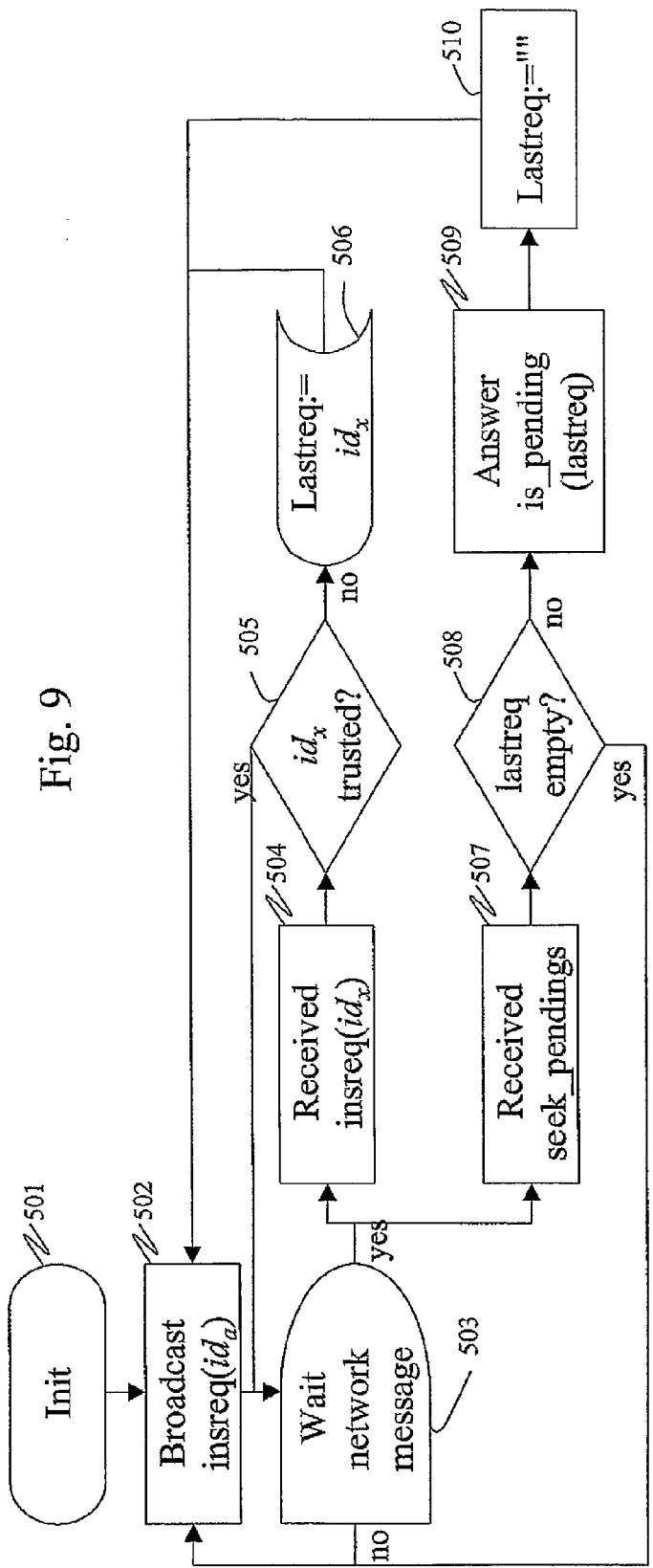
FIGS. 9 to 11 illustrate three stages of a preferred embodiment of the method of the invention.

FIG. 9 illustrates actions performed in device a. All other devices behave similarly at this stage as explained above. Steps 501 to 510 of this first stage of the method are explained bellow.

501: device a is idle; network is idle. Execution is transferred to 502.

502: device a broadcasts insertion request. Execution is transferred to 503.

503: device a waits for network messages. If no message arrives after a timeout, execution is transferred back to 502. In an illustrative embodiment the timeout value is set to 10 seconds.

504: Device a received an insertion request "insreq(id$_x$)" sent by device x. Execution is transferred to 505.

505: if x from "insreq(id$_x$)" belongs to the community of device a, execution is transferred back to 503. Otherwise, execution is transferred to 506. Note that the above-mentioned document "*Secure Long Term Communities in Ad Hoc Networks*" indicates a simple way for a device a to check if a device x belongs to its community or not.

506: the insertion request from device x is stored in the "lastreq" memory of device a. Note that if the memory that store "lasreq" can store only one item, the former content of "lastreq" is lost. Other embodiments may manage more complex memories, such as FIFO or arrays that would store more than one insertion request.

507: device a just received a "seek_pendings" message from device b chosen by the user. Execution is transferred to 508.

508: if the "lastreq" memory of device a is empty, device a does not answer to the "seek_pendings" message, and execution is transferred back to 502. Otherwise, if "lastreq" contains one entry, execution is transferred to step 509.

509: device a answers to device b with a message "is_pending(lastreq)". This message contains the identity or identities of devices that have previously sent insertion requests to device a, these insertion requests being stored in "lastreq" memory of a. Execution is then transferred to step 510.

It is to be noted that steps 507 to 509 correspond to steps 6.3 and 6.4 illustrated by FIG. 5.

510: The "lastreq" memory of device a is emptied. Note that this step is not mandatory, but prevents from further unnecessary message exchanges.

After this step, execution is transferred to step 503.

Second Stage of the Algorithm

This stage first lets the user choose the device (denoted b) that he will use to authorize insertion. Then device b demands and obtains pending insertion requests from other devices. User needs appropriate credentials to log on device b. This stage of the method corresponds to step 5.2 in FIG. 4 and steps 6.3 and 6.4 in FIG. 5.

Figure 10:
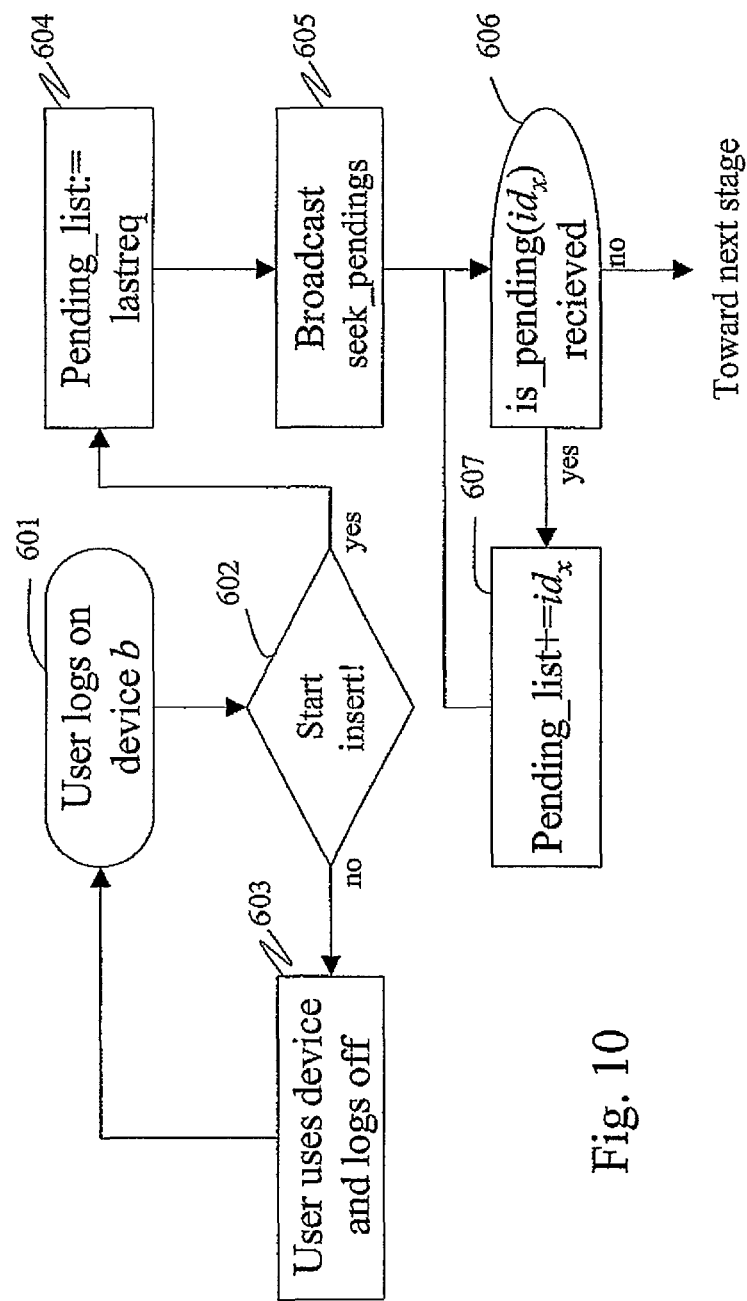

FIG. 10 shows the behavior of a device b at this stage. Steps 601 to 607 of this second stage of the method are explained bellow.

601: A user with appropriate credentials decides to log on device b. Execution is transferred to 602.

602: if user selects the command "start insert!", then execution is transferred to 604. Otherwise, it is transferred to 603.

603: User makes normal use of the device b then logs off. Execution is transferred to 601.

604: "Pending_list" is set to the value of "lastreq" memory of device b. This step is useful for treating an insertion request that could have been received by device b itself. Execution is transferred to 605.

605: device b broadcasts the message "seek_pendings" in the community. Execution is transferred to 606.

606: device b waits answers from other devices of the community. If an answer is received, execution is transferred to 607. After a predetermined timeout, execution is transferred to the next stage of the algorithm illustrated in FIG. 11.

607: an answer is_pending(id$_x$) was received. Then id$_x$ is added to "Pending_list" and execution is transferred back to 606.

It should be noted that the size of "Pending_list" is finite. A size of 16 elements for the "Pending_list" for instance would avoid too many retries and unnecessary message transmissions in classical situations.

Third Stage of the Algorithm

This stage lets the user choose one pending request and satisfy it.

This stage corresponds to steps 7.5 and 7.6 of FIG. 6. At the end of this part of the algorithm, the standard insertion method described in document "Secure Long Term Communities in Ad Hoc Networks" continues normally.

Figure 11:
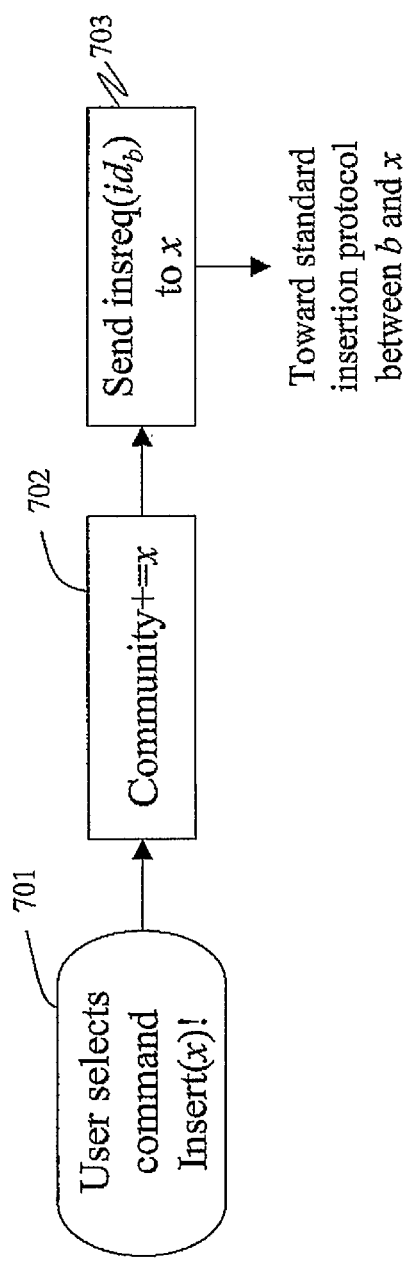

FIG. 11 shows the execution steps for this stage, when executed by device b. Steps 701 to 703 of this second stage of the method are explained bellow.

701: the user selects one pending insertion request from "Pending_list" of device b. In the case described here, there exists at least one insertion request, emitted by device x. Execution is transferred to 702.

702: device x is added to the list of the members of the community. For example id$_x$ is inserted in a list of trusted devices. This corresponds to the first step of normal insertion method described in the above-mentioned document. Execution is transferred to 703.

703: an insertion request is transmitted by device b to device x to request that device b enters device x's community. This can be done in many ways: First, the insertion request may be transmitted from device b to device a, together with a requirement to forward the request to device x. This allows insertion even in the case when there is no connectivity from device b to device x. In an alternative solution, device b may allow device a to periodically broadcast messages "insreq (id$_b$)" for some time. The duration is typically of order of one or two minutes, and the timeout between two broadcasts of "insreq(id$_b$)" should be of the same order than the timeout of step 503.

At the end of these three stages of the method, all necessary conditions for starting standard insertion protocol from the above-mentioned document are fulfilled, these conditions being:

Device b received devices x identity, id$_x$.

Device x received devices b identity, id$_b$.

In the preferred embodiment of the invention, device identity length is set to 160 bits. It is a secure hash of a public key contained in the device. This public key is 1024 bits long, and the secure hash algorithm is preferably SHA1. The size of "lastreq" memory is set to 160 bit also, that is "lastreq" can store one pending request at a time. Maximum length of "Pending_List" is set to 3 items.

Figure 12:
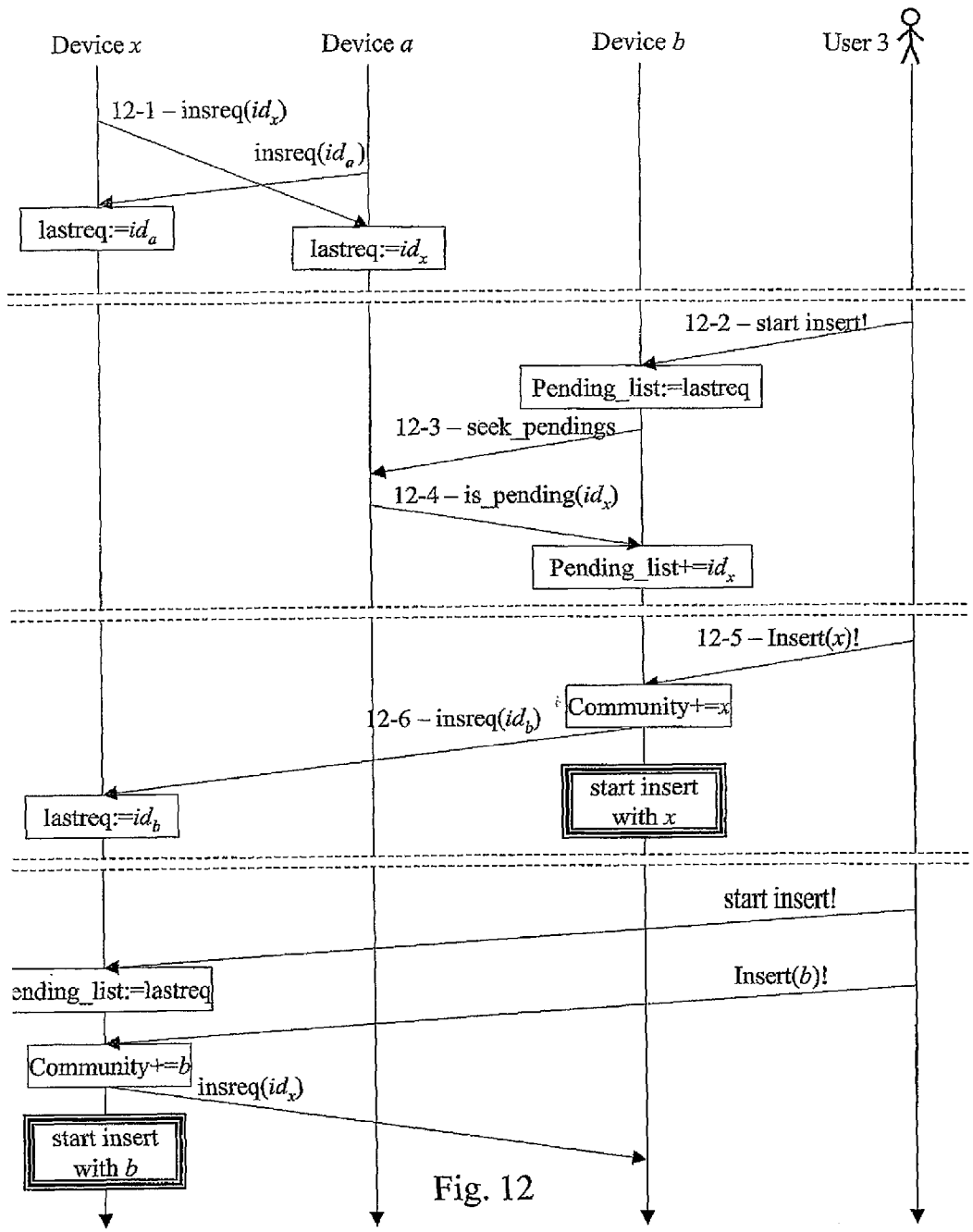
FIG. 12 shows network messages exchanged between devices and user interactions during the insertion method of the invention.

FIG. 12 illustrates the sequence of messages exchanged during the insertion of a new device x, detected by a device a, with device b as the user chosen device. All these devices implement the three stages of the method that have been described above.

User actions regarding devices b and x are also represented. Dotted horizontal lines represents arbitrary delays before user actions. These delays do not disturb the method: user is not obliged to respect any predetermined delay between actions.

Reference numbers 12-1 to 12-6 that appear on certain messages correspond to steps 5.1, 5.2, 6.3, 6.4, 7.5 and 7.6 illustrated in FIGS. 4, 5 and 6. Thick rectangles marked "start insert with x" and "start insert with b" mean that concerned devices may start their standard insertion protocol.

The invention presents the following advantages.

The invention facilitates device insertion into a community. It brings more flexibility to the user when he decides to insert a device in a community and respects the constraint that existing protocol are not modified.

The invention lets the user choose the best-suited device for new device insertion and the choice of this device is independent from the device that detected first the arrival of the new device. For example, when device insertion needs visual interface with the user, the user will prefer a device with good screen capabilities. Moreover, the device chosen by the user to validate the insertion may not necessarily directly communicate with the new device In the case of a community used by several users, one user may not be able to log on all devices of the community. Using prior art methods, this user can insert new devices only if he is granted log on credentials to the predetermined controller or the detector. Using the invention, this restriction does not apply anymore: the user is always able to insert a new device in the community.

Figure 13:
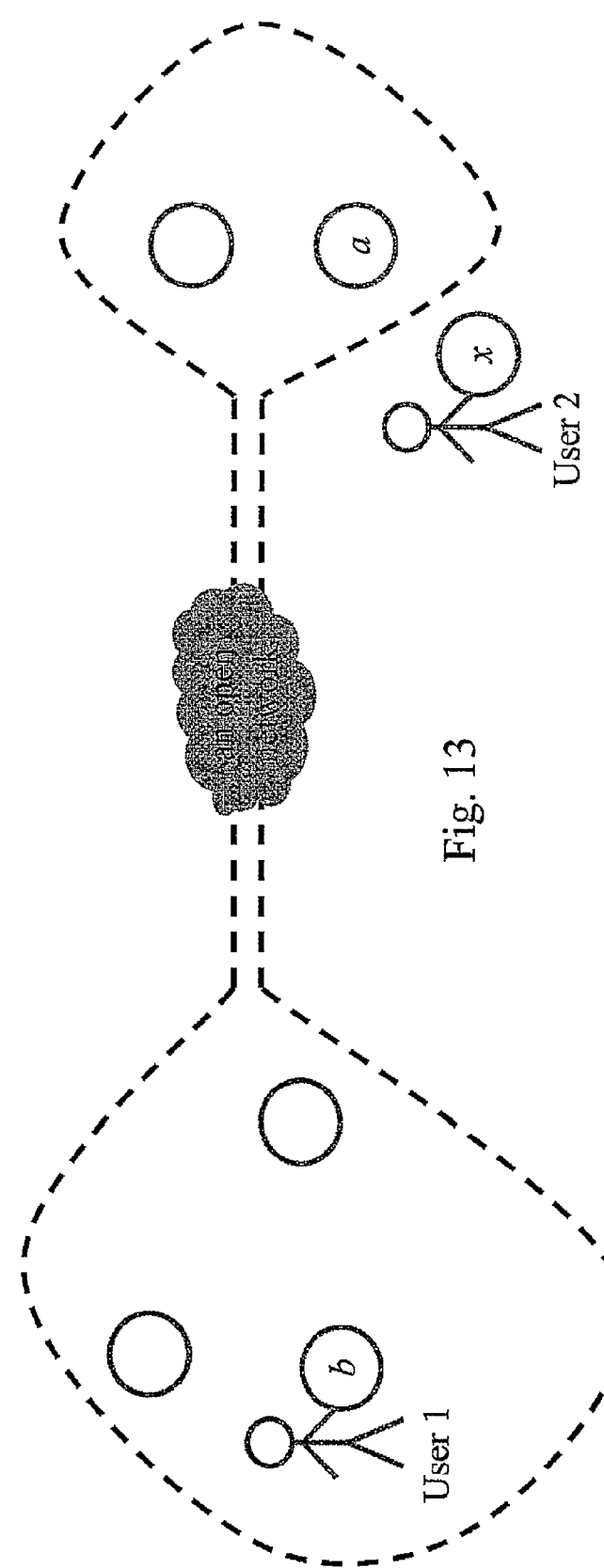
FIGS. 13 and 14 illustrate two situations in which the invention is particularly useful.

There is an advantage in the case illustrated by FIG. 13: when the community crosses (at least) one open network, such as the Internet. For instance, this corresponds to the case of a home network that spreads between a user's main home and it's vacation home, both sites being connected using ADSL Internet accesses. In this case, one user called "User 2" in FIG. 13 brings a new device x for insertion in the community. It may happen that "User 2" is not allowed to log on any device of the community in its immediate environment. In this case, prior art methods do not allow insertion, and "User 2" would be forced to obtain login credentials. Using the invention, "User 2" may get help from remote "User 1" who will choose a device b and start the insertion method. Note that "User 1" needs nothing more than credentials to log on device b. This allows device x insertion with no credentials revealed to "User 2".

Figure 14:
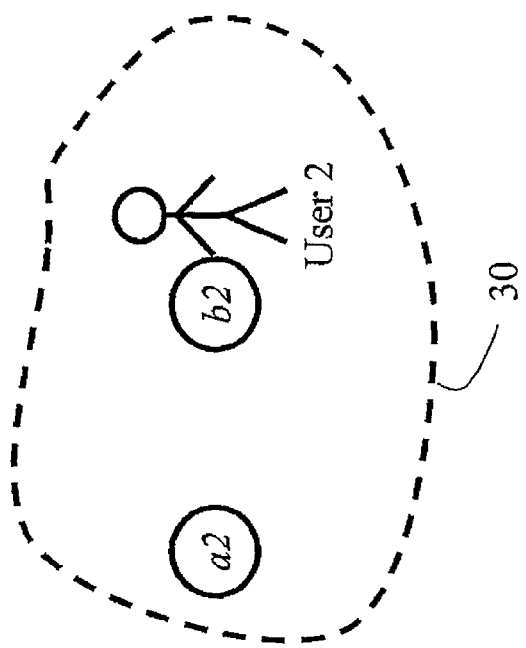
Figure 14:
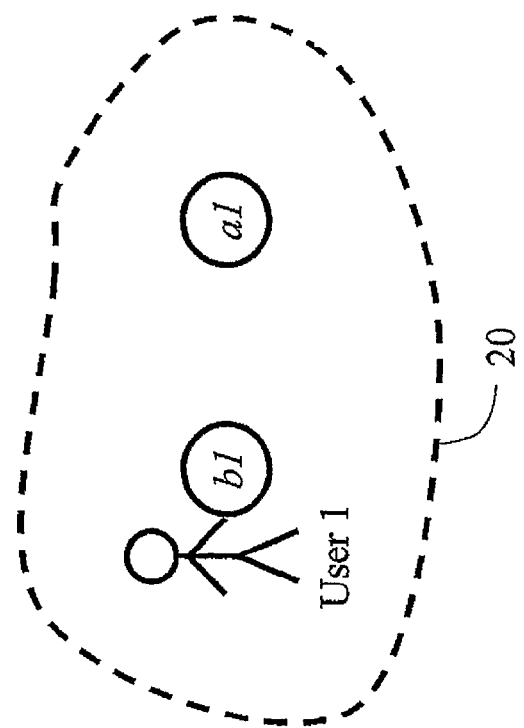

FIG. 14 illustrates a variant embodiment of the invention allowing to merge communities with the same advantages as described previously. Merging is a basic operation that turns two different communities into a single community. At the end of this operation, the devices that were in each of the community belong to one and the same.

In this embodiment, there are two modifications compared to the method described in view of FIG. 9-12:

First, when a device receives a "seek_pendings" message (step 507), it generates a message "insreq(id)" using the identity of the device that sent this "seek_pendings" message and it broadcasts this message multiple times (without knowing if it will be chosen by this device later for the insertion) for a duration of the order or 20 seconds. The timeout between such two broadcasts is of the order of 2 seconds.

Second, a device that receives a "seek_pendings" message will wait a few seconds (in the order of 15 seconds) before sending the "is_pending( )" message.

This variant embodiment is useful during the merge of two communities. It provides the ability to benefit from the advantages of the invention on both the communities to be merged.

FIG. 14 shows two communities, with one user per community. We note a1 the detector device for the first community 20, and a2 the detector device for the second community 30. We note b1 the inserting device chosen by user 1 and b2 the inserting device chosen by user 2.

User 1 asks on b1 for insertion. Device a1 receives from b1 a "seek_pendings" message and starts broadcasting messages "insreq($id_{b1}$)" with the identity of device b1. At approximately the same time, User 2 asks on b2 for insertion. Device a2 receives from b2 a "seek_pendings" message and starts broadcasting messages "insreq($id_{b2}$)" with the identity of device b2. Consequently, a2 and a1 will respectively receive the identities $Id_{b1}$ and $Id_{b2}$ that the other one is broadcasting. a1 will then return an "is_pending($id_{b2}$)" message to b1 and a2 will then return an "is_pending($id_{b1}$)" message to b2. Thus, b1 and b2 will both be aware of the identity of the other one, and will be able to insert each other.

Doing so allows insertion of b1 and b2 in each other's community, even if b1 and b2 are not able to directly communicate with each other allowing the merging of their respective communities.

The invention claimed is:

1. A method for inserting a new device in a community of devices comprising:
   selecting, by a user, a user chosen device from one of the community of devices for authorizing insertion of a new device into the community;
   storing, by each device of the community which receives an insertion request from a new device, the insertion request in a memory of said each device;
   forwarding, by each device of the community which receives a message seeking for a pending insertion request from the user chosen device, the at least one stored insertion request to said user chosen device; and
   performing, by the user chosen device, at least one user action for authorizing the insertion of the new device into the community.

2. The method according to claim 1, further comprising:
   selecting, using the user interface of the user chosen device, one of the insertion requests received by the user chosen device, to authorize the device having emitted said insertion request to be inserted in the community.

3. The method according to claim 2, further comprising:
   sending, from said user chosen device, an insertion request to the new device inserted in the community to request that said user chosen device enters the new device's community.

4. The method according to claim 3, wherein said insertion request from said user chosen device is transmitted to the new device inserted in the community through the device of the community having first forwarded the insertion request from the new device to the user chosen device in case said user chosen device cannot directly communicate with the new device.

5. The method of claim 1, wherein insertion requests contain a provable identity of the new device.

6. The method of claim 5, wherein the device having received an insertion request from a new device is further able to broadcast the provable identity of the chosen device to the new device.

7. A device adapted to belong to a community of networked devices, wherein said device comprises:
   a first memory for storing at least one insertion request received from a new device requesting to be inserted in the community;
   a network interface for sending the at least one insertion request stored in said first memory upon receiving a message seeking for a pending insertion request from a device chosen by a user of the community for performing at least one user action for authorizing the insertion of the new device in the community;
   a second memory for storing insertion requests sent by other devices of the community when said device is the user chosen device.

8. The device according to claim 7, further comprising:
   a user interface allowing a user to select one of the insertion requests received by the user chosen device, to authorize the device having emitted said insertion request to be inserted in the community when said device is the user chosen device.

* * * * *